US009951689B2

(12) United States Patent
Younes et al.

(10) Patent No.: US 9,951,689 B2
(45) Date of Patent: Apr. 24, 2018

(54) INTEGRATED CALCIUM LOOPING COMBINED CYCLE FOR SOUR GAS APPLICATIONS

(71) Applicant: Saudi Arabian Oil Company, Dhahran (SA)

(72) Inventors: Mourad Younes, Abqaiq (SA); Ali Hoteit, Abqaiq (SA); Aqil Jamal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 929 days.

(21) Appl. No.: 14/334,047

(22) Filed: Jul. 17, 2014

(65) Prior Publication Data
US 2016/0017798 A1 Jan. 21, 2016

(51) Int. Cl.
| F23C 10/01 | (2006.01) |
| F02C 3/22 | (2006.01) |
| C01B 3/36 | (2006.01) |
| F02C 3/30 | (2006.01) |
| F02C 3/34 | (2006.01) |
| F23C 10/22 | (2006.01) |
| F23C 13/06 | (2006.01) |
| F01K 13/00 | (2006.01) |
| F01K 23/10 | (2006.01) |
| F23C 99/00 | (2006.01) |
| C01B 3/06 | (2006.01) |
| C01B 17/44 | (2006.01) |

(52) U.S. Cl.
CPC .............. *F02C 3/22* (2013.01); *C01B 3/063* (2013.01); *C01B 3/36* (2013.01); *C01B 17/44* (2013.01); *F01K 13/00* (2013.01); *F01K 23/10* (2013.01); *F02C 3/30* (2013.01); *F02C 3/34* (2013.01); *F23C 10/01* (2013.01); *F23C 10/22* (2013.01); *F23C 13/06* (2013.01); *F23C 99/00* (2013.01); *F23C 2900/99008* (2013.01); *Y02E 20/16* (2013.01); *Y02E 20/344* (2013.01); *Y02E 20/346* (2013.01); *Y02E 60/36* (2013.01)

(58) Field of Classification Search
CPC ........................................................ C01B 3/36
USPC ........................................................ 431/200
See application file for complete search history.

(56) References Cited

U.S. PATENT DOCUMENTS 5,198,103 A * 3/1993 Meyer ................... C10G 1/002
 208/431
8,110,012 B2 2/2012 Chiu et al.
(Continued)

FOREIGN PATENT DOCUMENTS

| FR | 2 903 994 | 1/2008 |
| JP | H10-314536 | 12/1998 |

(Continued)

*Primary Examiner* — Avinash Savani
(74) *Attorney, Agent, or Firm* — Leason Ellis LLP

(57) ABSTRACT

A chemical looping combustion (CLC) process for sour gas combustion is integrated with a gas turbine combined cycle and a steam generation unit, and is configured to provide in-situ removal of $H_2S$ from the sour gas fuel by reacting the $H_2S$ with a oxygen carrier at a location within the fuel reactor of the CLC unit. The process is also configured such that oxygen-rich exhaust gases from the gas turbine combined cycle is used to feed the air reactor of the CLC unit and re-oxidize oxygen carriers for recirculation in the CLC unit.

36 Claims, 1 Drawing Sheet

(56) References Cited

U.S. PATENT DOCUMENTS

| | | | |
|---|---|---|---|
| 8,496,909 B2 | 7/2013 | Ramkumar et al. | |
| 2002/0025987 A1* | 2/2002 | Iijima | C01B 3/38 518/704 |
| 2013/0255272 A1 | 10/2013 | Ajhar et al. | |
| 2013/0255550 A1 | 10/2013 | Ajhar et al. | |

FOREIGN PATENT DOCUMENTS

| | | |
|---|---|---|
| JP | 2007-091786 | 4/2007 |
| JP | 2013-124662 | 6/2013 |
| WO | WO 99/02471 | 1/1999 |
| WO | WO 2010/014938 | 2/2010 |
| WO | WO 2010/117778 | 10/2010 |

\* cited by examiner

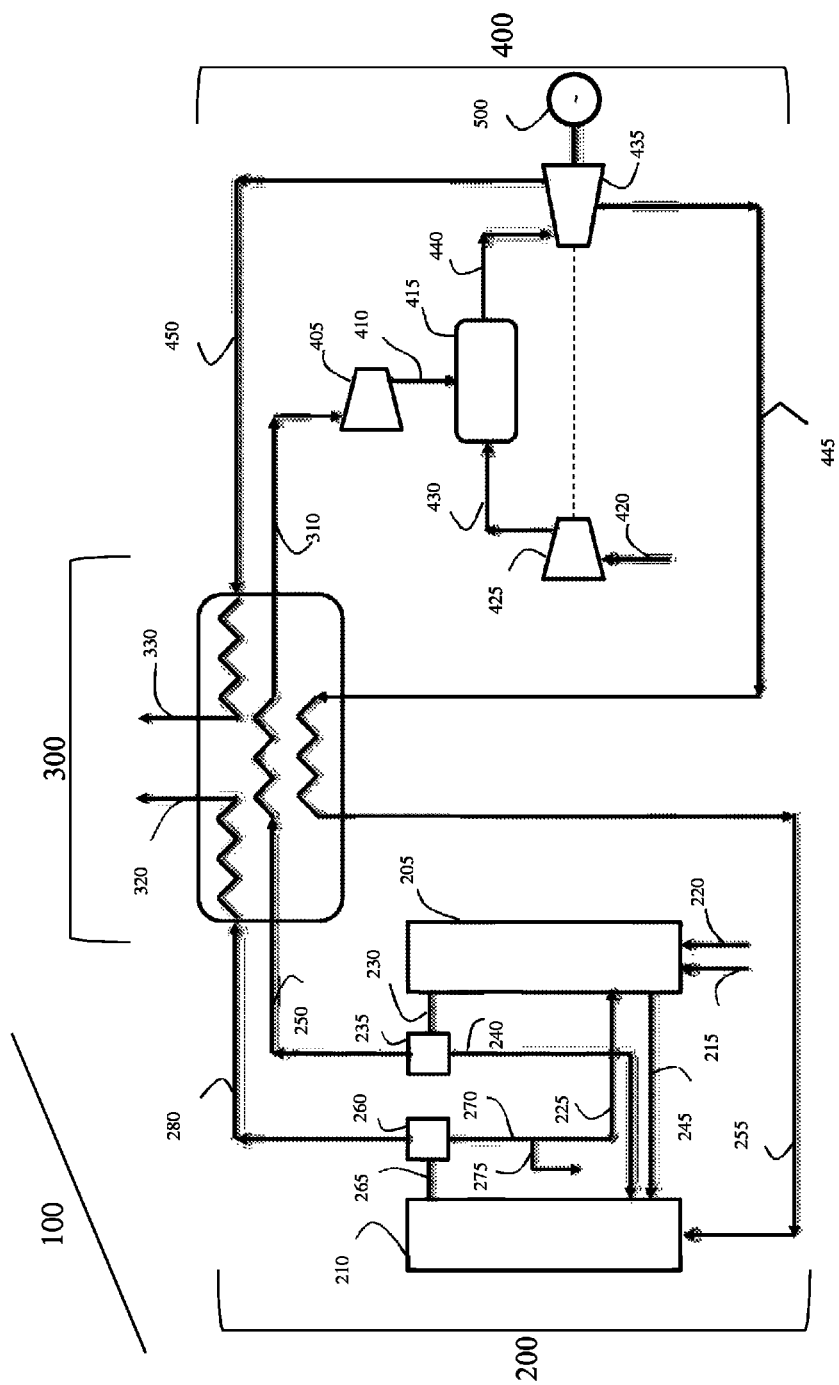

INTEGRATED CALCIUM LOOPING COMBINED CYCLE FOR SOUR GAS APPLICATIONS

TECHNICAL FIELD

The present invention relates to a process for sour gas reforming and combustion to produce heat and electricity. Further, the present invention relates to sour gas valorization by in-situ de-sulfurization and combustion for steam and power production. More specifically, the present invention relates to a chemical looping combustion of sour gas process involving the production of syngas, and the subsequent use of syngas to generate power.

BACKGROUND

The search for new, environmentally friendly sources of energy is perhaps one of the most challenging problems facing the world today. This search has been further complicated by the increased demand for energy worldwide. As the need for additional energy sources grows throughout the world, energy producers must begin to utilize unconventional energy resources to meet the increasing demand. While established non-renewable energy sources (e.g., recoverable coal, conventional oil and natural gas) continue to be the major sources of energy throughout the world—due to the fact that renewable energy sources remain too low in quantity and too limited to specific localities—energy producers must begin to look at additional energy sources that may be more sustainable long term. In particular, energy producer must look to other non-renewable energy sources such as unconventional oil resources (e.g., oil shale, tar-sands, and heavy crude) and unconventional natural gas resources (e.g., gas in pressurized aquifers and coal seams) to meet the increasing demand for energy.

Among these unconventional non-renewable energy sources is sour gas fuel. Sour gas is a natural gas that contains significant levels of hydrogen sulfide ($H_2S$)—a colorless, flammable, and corrosive gas that can be damaging to the materials and mechanical parts of the combustion systems at high temperatures. Further, when $H_2S$ is exposed to air, it easily oxidizes into a sulfur oxide ($SO_x$) such as $SO_2$—an air pollutant.

Combustion is a commonly used reaction in the field of power generation and one that can utilize sour gas as fuel in certain instances. Besides being corrosive, sour gas may contain inert gases that decrease its calorific value, and thus was not previously considered to be a particularly useful fossil fuel for combustion processes. For example, direct combustion of sour gas in a gas turbine is not always possible due to the composition and the physical characteristics of the gas, particularly if the sour gas has an $H_2S$ content above 5%. The increasing worldwide demand for energy, however, has forced the use of sour gas as an energy source. There are many global undeveloped and underdeveloped sour gas reservoirs, and if these resources are to be used for the generation of power, the ability of a combustion process to handle higher quantities of $H_2S$ is necessary in order to make such application possible. Not surprisingly, much effort is underway worldwide to reduce the economic impact of $H_2S$ and sulfur management for sour gas fuels.

Conventionally, to avoid the corrosive effects and the pollution associated with combustion of sour gas, pretreatment of the sour gas is required to substantially remove the sulfur compounds from the gas stream—a process known as "sweetening." For example, an amine gas treating process, such as one that includes an amine unit, a sulfur recovery unit, and a tail gas unit can be used to "sweeten" the sour gas (i.e., remove the $H_2S$). The major shortcoming of processes for sweetening sour gas is that they are very costly.

Chemical looping combustion (CLC) is a specific type of combustion reaction that was originally created in the 1950s to produce $CO_2$, but recently it has received increased attention as a potential $CO_2$ capturing process. In a conventional CLC process, an oxygen carrier acts as an intermediate transporter of oxygen between air and fuel, and thus the air and the fuel are prevented from directly contacting one another. Typically, a solid metal oxide oxygen carrier is used to oxidize the fuel stream in a fuel reactor. This results in the production of $CO_2$ and $H_2O$. The reduced form of the oxygen carrier is then transferred to the air reactor, where it is contacted with air, re-oxidized to its initial state, and then returned back to the fuel reactor for further combustion reactions.

CLC processes, in some instances, have also been combined with a gas turbine combined cycle for the generation of power. However, in these combinations, the fuel reactor is used to reform the sour gas and produce a syngas that is fed to a gas turbine. A first stream of ambient air is compressed and fed to the CLC air reactor to oxidize the oxygen carrier while another ambient air stream is compressed and fed to the gas turbine combustion chamber to combust the fuel. The compression of ambient air requires additional equipment and energy, thereby resulting in additional costs for the system.

Thus, there is a need for a cost-effective and energy-efficient system that combines the combustion of sour gas with power generation. Further, there is a need for a process for the combustion of sour gas with high efficiency in energy conversion, but without the costly pretreatment of $H_2S$. The present invention achieves these needs and others.

SUMMARY

The present invention is directed to a process for the chemical looping combustion (CLC) of sour gas process with an integrated gas turbine combined cycle and steam generation unit. In one or more embodiments, sour gas is fed to a fuel reactor of a CLC unit along with oxygen carriers to generate synthetic gas (syngas) and capture sulfur compounds from the sour gas. The syngas stream exiting the fuel reactor is integrated in the steam generation unit to recover its heat before it is compressed and fed to a combustion chamber of a gas turbine unit along with compressed air from a separate compressor. The syngas is combusted in the combustion chamber, and oxygen-rich exhaust gases from the chamber is then transported to a multistage turbine of the gas turbine unit, where it is expanded producing power.

Part of the oxygen-rich exhaust gases is withdrawn from the multistage turbine to feed the air reactor of the CLC unit after it is cooled and its energy is recovered in the steam generation unit. The oxygen-rich exhaust gases enters the air reactor and reacts with circulating solid particles (e.g., reduced oxygen carriers used to capture the sulfur compounds in the fuel reactor) in the CLC unit, thereby re-oxidizing the solid particles. The re-oxidized solid particles are recirculated to the fuel reactor and/or partially purged from the system. The now oxygen-lean (oxygen depleted) exhaust gases exits the air reactor and is transported to the steam generation unit to recover its energy, before exiting the system through the stack. The exhaust gases that remained in the multistage turbine continue their expansion before it is transported to the steam generation block and vented through a stack.

BRIEF DESCRIPTION OF THE DRAWING FIGURES

A more complete understanding of the invention and its many features and advantages will be attained by reference to the following detailed description and the accompanying drawing. It is important to note that the drawing illustrates only one embodiment of the present invention and therefore should not be considered to limit its scope.

FIG. 1 is a schematic of a process that integrates a calcium looping combustion cycle and a gas turbine combined cycle in accordance with at least one embodiment of the present application.

DETAILED DESCRIPTION OF CERTAIN EMBODIMENTS

The present application relates to a chemical looping combustion (CLC) of sour gas process with an integrated gas turbine combined cycle. As described herein, the CLC process of the present application is designed to overcome the deficiencies associated with direct combustion and conventional CLC processes as they related to the combustion of sour gas. The process of the present application is also designed to overcome deficiencies associated with previous CLC processes that have been combined with gas turbine cycles.

The CLC process of the present application allows for the direct generation of power from a sour gas feed, and eliminates the need for a separate sweeting system to remove sulfur compounds. More specifically, the process of the present application allows for the in-situ removal of $H_2S$ from sour gas fuel, and the production of syngas, which is used to power a gas turbine combine cycle (gas turbine unit) and a steam generation unit (which can be generally thought of as being a power generating unit). The CLC process of the present application also utilizes a portion of the exhaust gases from the multistage turbine of the gas turbine unit to supply oxygen to the air reactor of the CLC unit. In particular, the process allows for the extraction of oxygen-containing exhaust gases from the gas turbine at the appropriate pressure to directly inject the gases into the air reactor, thereby eliminating the need for a compressor and driving turbine or motor.

These aspects make the process of the present application more efficient as compared with previous processes since they allow for a reduction in the size of the multistage turbine and eliminate the need to build and operate a separate air compressor or fan to inject compressed air into the air reactor. Overall, the process of the present invention leads to a higher overall efficiency compared to a similar process in which the gas turbine combined cycle and the chemical looping process were not linked. Other advantages of the present invention will be appreciated in view of the following description.

FIG. 1 illustrates one exemplary system 100 for performing the chemical looping combustion of sour gas and the gas turbine combine cycle in accordance with the present invention. FIG. 1 likewise shows an exemplary flow scheme that depicts one CLC process, one steam generation unit, and one gas turbine combined cycle in accordance with the present invention. The system 100 can be thought of as having and defined by three interconnected units which define three stages. More specifically, the system 100 has a CLC unit 200, and steam generation unit 300, and a gas turbine unit 400, all of which are operatively connected to one another.

The CLC unit 200 can be thought of as having and defined by two distinct reaction zones. More specifically, a first reaction zone is defined by a fuel reactor 205, and a second reaction zone is defined by an air reactor 210, which is operatively connected to the fuel reactor 205. The fuel reactor 205 can take any number of suitable forms and is designed to allow for the combustion or reforming of a fuel or the like therein. The fuel reactor 205 is thus defined by a structure (housing) that defines a hollow interior in which the fuel combustion occurs. In one or more embodiments, the fuel reactor 205 and/or the air reactor 210 can be a turbulent bed reactor, a fluidized bed reactor, or a circulating fluidized bed reactor.

The fuel is injected into the fuel reactor 205 through transport line 215. In an exemplary embodiment, the fuel is a sour gas stream. The sour gas stream can be comprised of $H_2S$, hydrocarbons, $CO_2$, and inert gases such as $N_2$. The sour gas stream can have an $H_2S$ concentration of between about 0.1 and 75%, preferably between about 0.1 and 50%. In addition, other fuels can be used in the practice of the present invention.

An oxygen carrier, which provides oxygen for the combustion/reforming reactions in the fuel reactor 205 and reacts with the sulfur compounds, is injected into the fuel reactor 205 via transport line 220. In exemplary embodiments, the oxygen carriers are solid, calcium-based particles, such as CaO (lime) and/or $CaCO_3$ (limestone). In other embodiments, the oxygen carrier can be in the form of any number of suitable oxygen carriers, including but not limited to magnesium-based particles or synthetic particles that have the ability to react with oxygen and sulfur. In other embodiments, the oxygen carriers can be a mixture of calcium-based particles and magnesium-based particles.

In the fuel reactor 205, the fuel (sour gas) reacts (combustion reaction) with the oxygen carriers ($CaO/CaCO_3$), as well as calcium sulfate ($CaSO_4$) (which also serves as an oxygen carrier), which is transported to the fuel reactor 205 from the air reactor 210 via transport line 225. The fuel reactor 205 can be operated in a temperature range of 600° C. and 1300° C., preferably at around 1050° C. In one or more embodiments, the fuel reactor can also be operated at a pressure ranging from 0.7 bar to 15 bar. The solid particles of the calcium-based oxygen carriers ($CaO/CaCO_3$) react with the sulfur of the sour gas to produce calcium sulfide (CaS). The calcium-based oxygen carriers ($CaO/CaCO_3$) also react with the other components of the sour gas (e.g., $CH_4$) to produce syngas. Additional oxygen needed to transform the sour gas components into syngas is provided by the $CaSO_4$ transported from the air reactor. While CaO and $CaCO_3$ provide oxygen to transform the sour gas into syngas, the primary reaction for CaO and $CaCO_3$ in the fuel reactor 205 is with the sulfur components of the sour gas to produce CaS (i.e., in-situ $H_2S$ removal). The primary reaction for the $CaSO_4$ in the fuel reactor is to provide oxygen for the remaining components of the sour gas to produce syngas.

The produced syngas and CaS particles exit the fuel reactor via transport line 230. The syngas and CaS particles then enter a first gas-solid separator 235 (e.g., a cyclone), where the CaS particles are separated from the gas stream and transported to the air reactor 210 via transport line 240. In one or more embodiments, some CaS particles produced in the fuel reactor can be directly transported from the fuel reactor 205 to the air reactor 210 via transport line 245. The syngas exits the gas-solid separator 235 via transport line 250, and is routed to the steam generation unit 300. The syngas produced in the fuel reactor can be composed of CO, $H_2$, $CO_2$, $H_2O$, hydrocarbons, and inert gases.

The syngas, via transport line 250, enters the steam generation unit 300 where it is cooled. The steam generation unit 300 is a multi-heat exchanger unit where water is evaporated to generate steam. The resulting steam can be used, for example, to drive steam turbines and generate power and/or heat, which in some instances, can be used for a thermal desalination system that can be integrated into the process of the present invention. The cooled syngas then exits the steam generation unit 300 via transport line 310, and enters the gas turbine unit 400. More specifically, the syngas via transport line 310 enter a gas compressor 405 of the gas turbine unit 400. The syngas is compressed in gas compressor 405 and then routed via transport line 410 to a combustion chamber 415 of the gas turbine unit 400. Air, via transport line 420, is injected into an air compressor 425, where it is compressed to the gas turbine typical pressure ranging between 15 and 50 bar. In one or more variations, the gas compressor 405 and/or the air compressor 425 can be a multistage compressor with intercooling, the intercooling being integrated in the steam generation unit 300 to increase the efficiency of the system 100.

The compressed air is then fed into the combustion chamber 415 via transport line 430. In combustion chamber 415, the compressed syngas is combusted in the presence of oxygen from the compressed air to produce exhaust gases. The combustion chamber 415 of the gas turbine unit 400 can be operated in a pressure range of 5 to 50 bar. These exhaust gases are then routed from the combustion chamber 415 to the multistage turbine 435 of the gas turbine unit 400 via transport line 440. The exhaust gases that enter the multistage turbine 435 are oxygen-rich. In an exemplary embodiment, the exhaust gases have an $O_2$ concentration of approximately 14%. The exhaust gases are expanded in the multistage turbine 435 through several stages. In at least one variation, the air compressor 425 and/or the gas compressor 405 can be linked to the multistage turbine 435 of the gas turbine unit 400 by any means available in the literature for coupling compressors and turbines. The excess work provided by the multistage turbine 435 can be converted to electricity via an electric generator (generally shown at 500 in FIG. 1).

During expansion in the multistage turbine 435, a first extracted stream of exhaust gases (an oxygen-rich gas stream) is recovered between two stages of the multistage turbine 435 (e.g. a medium pressure stage), and exits via transport line 445. The medium pressure stage can be at a pressure in the range of 2 to 15 bar. In exemplary embodiments, this stream of exhaust gases is recovered just above the desired injection pressure in the air reactor 210 (1 to 15 bar). The first extracted stream of exhaust gases is transported via transport line 445 to the steam generation unit 300, where it is cooled and its energy is recovered (resulting in steam generation in unit 300). The first extracted stream of exhaust gases then exits the steam generation unit 300 and is routed to the air reactor 210 via transport line 255. The remaining exhaust gases (the second extracted stream of exhaust gases) in the multistage turbine 435 continue their multistage expansion until they reach the turbine exhaust pressure to enter the steam generation unit 300 via transport line 450. In the steam generation unit 300 via transport line 450, the energy of the second extracted stream of exhaust gases is recovered, and these exhaust gases are routed to a stack via transport line 330.

In one or more variations, the multistage turbine 435 can integrate a reheating step; the reheating being integrated into a) air compressor 425 (in variations including interceding), b) transport line 445, c) transport line 280, d) transport line 250, and/or steam generation unit 300 to increase the overall efficiency of the process.

As explained above, the first extracted stream of exhaust gases (an oxygen-rich exhaust stream) is routed to the air rector 210 via transport line 255. In the air reactor 210, the oxygen from the exhaust gases reacts with the injected CaS particles (injected via lines 240 and 245) to form $CaSO_4$. The air reactor is typically operated at a temperature 10 to 200 K higher than the fuel reactor. More specifically, the air reactor can generally be operated between 700° C. and 1300° C. In an exemplary embodiment, the air reactor 210 is operated at about 50 K above the temperature of the fuel reactor. In one or more embodiments, the air reactor can also be operated at a pressure ranging from 0.7 bar to 15 bar.

The first extracted stream of exhaust gases (now oxygen-depleted) entrains the solid particles (e.g. $CaSO_4$) in the air reactor, and both enter a second gas-solid separator 260 (e.g., a cyclone) via transport line 265. The solid particles (e.g. $CaSO_4$) are separated from the stream of exhaust gases and exit the second gas-solid separator 260 via transport line 270. The solid particle stream (e.g., $CaSO_4$) in transport line 270 is then routed back to the fuel reactor 205 via transport line 225. In one or more variations, a portion of the solid particle stream (e.g., excess solid particles) in transport line 270 can be extracted out of the system via transport line 275. The oxygen-depleted stream of exhaust gases exits the second gas-solid separator 260 via transport line 280 and is routed to the steam generation unit 300. In the steam generation unit 300, the oxygen-depleted exhaust gases are cooled, and its energy is recovered. The exhaust gases then exits the steam generation unit 300 via transport line 320 and is route to the stack.

In another embodiment of the system, stream 445 can be extracted at the last stage of the multistage turbine 435 as is the case of stream 450 in the above embodiment. In this embodiment, stream 445 can then be compressed by any available means to reach the injection pressure of the air reactor 210. This embodiment is desirable when the multistage turbine 435 design cannot provide a slip stream 445 at an intermediate pressure. In a variation of this embodiment, the compression step required for stream 445 can be replaced by a compression step at stream 255 preferably, or at any of streams 265, 280 and 320.

In one or more embodiments, it is possible to supplement the oxygen-rich stream of exhaust gases 255 with an air stream to enter air reactor 210 and supply oxygen to the oxygen carrier. The air stream can be fed at the bottom of the air reactor 210 or at an intermediate level.

EXAMPLE

The following example is provided to better illustrate an embodiment of the present invention, but it should not be construed as limiting the scope of the present invention.

In this example, the sour gas feed has a composition of 60% $CH_4$, 20% $H_2S$, 10% $CO_2$, and 10% $N_2$ by volume. The sour gas is injected into the fuel reactor along with $CaCO_3$ (limestone) and recirculated $CaSO_4$ to generate CaS and syngas. The fuel reactor is operated at a temperature of approximately 1050° C. The syngas generated in the fuel reactor has a composition of approximately 55% $H_2$ and 30% CO, with the rest of the syngas being composed of $H_2O$, $CO_2$, and $N_2$. After separation from the CaS, the syngas is cooled in the steam generation unit (generating steam), and then fed into the gas compressor. The syngas is compressed and then fed to the gas turbine combustion chamber to burn with air provided by the air compressor.

The combustion chamber produces exhaust gases that exit the combustion chamber and enter the multistage turbine. The temperature of the exhaust gases exiting the combustion chamber is controlled to meet the design temperature of the gas turbine (i.e., 1400° C.). Controlling the temperature of the exhaust gases is accomplished by controlling the temperature of the syngas transport line to the combustion chamber. The exhaust gases are expanded in the multistage turbine to a pressure of approximately 3 to 15 bar, at which point 30% of the stream of exhaust gases is extracted at this pressure to feed the air reactor of the CLC unit. The remaining exhaust gases in the multistage turbine continue their expansion before exiting the turbine and being transported to the steam generation unit and eventually to the stack.

The extracted stream of exhaust gases feeds the air reactor which is operated at approximately 1100° C. The extracted stream of exhaust gases is rich in oxygen. In the air reactor, the CaS generated in the fuel reactor is injected and then oxidized by the oxygen in the stream of exhaust gases to produce $CaSO_4$. The resulting $CaSO_4$ is partially recycled to the fuel reactor and partially purged from the system. The now oxygen-lean (oxygen-depleted) stream of exhaust gases exits the air reactor and is cooled in the steam generation unit prior to being transported to the stack.

As explained above, the present invention is directed to a process that integrates the CLC of sour gas with a steam generation and a gas turbine combined cycle. The integration of these procedures into one integrated system allows for the reduction in overall capital expenditures and operational expenditures for the system. The process of the present application allows for the use of sour gas—an unconventional energy resource—to generate heat and/or steam, power, and in some variations desalinated water. This process can be applied to any sour gas field containing sulfur compounds, as the sulfur will react with the solid circulating particles of the CLC unit (e.g. calcium-based particles), and the resulting sulfur products can be eliminated from the system. The generated product gas (e.g., syngas) can be combusted in the gas turbine to produce heat and steam.

While the present invention has been described above using specific embodiments and examples, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A process for utility and power generation using sour gas fuel integrating a chemical looping combustion process, a gas turbine, and a steam generation unit, comprising the steps of:
    injecting an oxygen carrier and a sour gas fuel into a fuel reactor;
    reforming the sour gas fuel in the fuel reactor to produce syngas and a reduced oxygen carrier;
    separating the reduced oxygen carrier from the syngas;
    cooling the syngas by passing the syngas through the steam generation unit;
    combusting the cooled syngas in a combustion chamber of the gas turbine whereby exhaust gases are produced;
    cooling at least a first portion of the exhaust gases by passing the first portion of the exhaust gases through the steam generation unit; and
    injecting the cooled first portion of the exhaust gases into an air reactor to oxidize the reduced oxygen carrier which was separated from the syngas resulting in formation of oxygen-depleted exhaust gases.

2. The process of claim 1, wherein the fuel reactor is one of a turbulent bed, fluidized bed, and circulating fluidized bed.

3. The process of claim 1, wherein the air reactor is one of a turbulent bed, fluidized bed, and circulating fluidized bed.

4. The process of claim 1, wherein the cooled syngas is compressed prior to delivery to the combustion chamber of the gas turbine for combustion thereof.

5. The process of claim 4, wherein compressed air is injected into the combustion chamber of the gas turbine for combustion of the cooled syngas.

6. The process of claim 1, wherein a second portion of the exhaust gases is passed through the steam generation unit resulting in generation of steam, wherein the first and second portions of exhaust gases are kept separated within the steam generation unit.

7. The process of claim 1, wherein the gas turbine comprises a multistage turbine, wherein the first portion of the exhaust gases comprises an oxygen-rich gas that is extracted from a medium pressure stage of the multistage turbine.

8. The process of claim 1, wherein the gas turbine comprises a multistage turbine, wherein the first portion of the exhaust gases comprises an oxygen-rich gas that is extracted from the last stage of the multistage turbine.

9. The process of claim 8, further including the step of compressing the extracted first portion of exhaust gases to reach the injection pressure of the air reactor.

10. The process of claim 8, further including the step of compressing the oxygen-depleted exhaust gases.

11. The process of claim 1, further including the step of injecting an air stream into the air reactor to oxidize the reduced oxygen carrier.

12. The process of claim 1, wherein the reduced oxygen carrier contains sulfur.

13. The process of claim 12, wherein the reduced oxygen carrier comprises CaS.

14. The process of claim 1, further including the step of transporting the oxidized oxygen carrier from the air reactor to the fuel reactor into which the oxidized oxygen carrier is injected.

15. The process of claim 14, further including the step of separating the oxidized oxygen carrier from the oxygen-depleted exhaust gases and delivering at least a portion of the oxidized oxygen carrier to the fuel reactor.

16. The process of claim 1, wherein the cooled first portion of the exhaust gases enters an inlet of the air reactor to entrain and oxidize the reduced oxygen carrier.

17. The process of claim 16, wherein the reduced oxygen carrier comprises CaS and the oxidized oxygen carrier comprises $CaSO_4$.

18. The process of claim 5, wherein the air compressor comprises a multistage compressor with intercooling, the intercooler being part of a steam generation block.

19. The process of claim 1, wherein the exhaust gases produced by the combustion in the combustion chamber of the gas turbine is expanded due to a multistage construction of the gas turbine.

20. The process of claim 1, wherein the steam generation unit includes a stack through which cooled exhaust gases passes after exchanging heat in the steam generation unit.

21. The process of claim 1, wherein the cooled exhaust gases from the gas turbine combustion chamber comprises the only means for oxidizing the reduced oxygen carrier that is injected into the air reactor.

22. A utility and power generation system that utilizes a chemical looping combustion process comprising:
a source of sour gas fuel;
a fuel reactor in which the sour gas fuel and an oxygen carrier are introduced, the sour gas is reformed to form a product stream, and the oxygen carrier is reduced;
a steam generation unit that is in fluid communication with the fuel reactor and receives the product stream through a first conduit, the steam generation unit being configured to act as a heat transfer unit that cools the product stream;
a gas turbine that is in fluid communication with the steam generation unit and receives the cooled product stream through a second conduit, the gas turbine including a combustion chamber for combusting the cooled product stream to generate exhaust gases;
a third conduit that fluidly connects the gas turbine to the steam generation unit such that at least a first portion of the exhaust gases is transported from the gas turbine to the steam generation unit which acts to cool the exhaust gases;
an air reactor that is fluidly connected to the gas turbine by the third conduit and a fourth conduit such that the cooled exhaust gases are delivered to the air reactor, the fourth conduit being fluidly connected between the steam generation unit and the air reactor, the air reactor being in fluid communication with the fuel reactor such that the reduced oxygen carrier is received from the fuel reactor and is oxidized by the cooled exhaust gases from the combustion chamber of the gas turbine resulting in formation of oxygen-depleted exhaust gases; and
wherein the air reactor is fluidly connected to the steam generation unit which acts to cool the oxygen-depleted exhaust gases exiting the air reactor.

23. The system of claim 22, further including a gas compressor for compressing the cooled product stream which comprises syngas prior to delivery to the combustion chamber of the gas turbine for combustion thereof.

24. The system of claim 22, further including a fifth conduit that fluidly connects the gas turbine to the steam generation unit such that a second portion of the exhaust gases is transported from the combustion chamber to the steam generation unit which acts to cool the second portion of the exhaust gases prior to being vented from the steam generation unit.

25. The system of claim 24, wherein the first and second portions of exhaust gases are maintained separate from one another as they flow through the steam generation unit.

26. The system of claim 22, wherein the gas turbine comprises a multistage turbine, wherein the exhaust gases comprises an oxygen-rich gas that is extracted from a medium pressure stage of the multistage turbine.

27. The system of claim 22, wherein the reduced oxygen carrier contains sulfur.

28. The system of claim 27, wherein the reduced oxygen carrier comprises CaS.

29. The system of claim 22, further including a fifth conduit fluidly connecting the air reactor to the fuel reactor for transporting the oxidized oxygen carrier from the air reactor to the fuel reactor into which the oxidized oxygen carrier is injected.

30. The system of claim 29, further including a first separator that is configured to separate the oxidized oxygen carrier from the oxygen-depleted exhaust gases and deliver at least a portion of the oxidized oxygen carrier to the fuel reactor.

31. The system of claim 29, wherein the reduced oxygen carrier comprises CaS and the oxidized oxygen carrier comprises $CaSO_4$.

32. The system of claim 22, wherein the exhaust gases produced by the combustion in the combustion chamber of the gas turbine is expanded due to a multistage construction of the gas turbine.

33. The system of claim 22, wherein the cooled exhaust gases from the gas turbine combustion chamber comprises the only means for oxidizing the reduced oxygen carrier that is injected into the air reactor.

34. The system of claim 22, wherein the gas turbine is configured to generate electricity.

35. The system of claim 22, wherein the oxygen carrier comprises solid, calcium-based particles.

36. The system of claim 35, wherein the oxygen carrier is at least one of CaO (lime) and $CaCO_3$ (limestone).

* * * * *